(12) United States Patent
Fernandez et al.

(10) Patent No.: US 12,516,634 B2
(45) Date of Patent: Jan. 6, 2026

(54) TURBOMACHINE COMPRISING A SPEED REDUCTION GEAR INTEGRATING AN ELECTRIC MACHINE

(71) Applicant: SAFRAN TRANSMISSION SYSTEMS, Colombes (FR)

(72) Inventors: Maxime Fernandez, Moissy-Cramayel (FR); Yohan Douy, Moissy-Cramayel (FR); Boris Pierre Marcel Morelli, Moissy-Cramayel (FR); Jordane Emile André Peltier, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 18/426,683

(22) Filed: Jan. 30, 2024

(65) Prior Publication Data

US 2024/0254923 A1 Aug. 1, 2024

(30) Foreign Application Priority Data

Jan. 31, 2023 (FR) ...................................... 2300889

(51) Int. Cl.
*F02C 7/36* (2006.01)
*B64C 11/30* (2006.01)
(Continued)

(52) U.S. Cl.
CPC .............. *F02C 7/36* (2013.01); *B64C 11/306* (2013.01); *B64D 35/024* (2024.01); *F01D 15/10* (2013.01);
(Continued)

(58) Field of Classification Search
CPC ........ F01D 13/00; F01D 13/003; F01D 15/08; F01D 15/10; F01D 15/12;
(Continued)

(56) References Cited

U.S. PATENT DOCUMENTS 10,180,080 B2 * 1/2019 Munevar ................... H02P 3/06
10,400,858 B2 * 9/2019 Mitrovic ................... F16H 1/20
(Continued)

FOREIGN PATENT DOCUMENTS

| EP | 3 201 492 B1 | 11/2022 |
| FR | 3 073 569 A1 | 5/2019 |
| FR | 3 116 303 A1 | 5/2022 |

OTHER PUBLICATIONS

France Search Report and Written Opinion mailed Jul. 15, 2023, issued in Application No. FR 2300889, filed Jan. 31, 2023, 8 pages.

*Primary Examiner* — Brian P Wolcott
(74) *Attorney, Agent, or Firm* — CHRISTENSEN O'CONNOR JOHNSON KINDNESS PLLC (57) ABSTRACT

An aircraft turbomachine includes a speed reduction gear having an input pinion connected to a power shaft and an output pinion connected to a propeller shaft. An electric machine is integrated into the speed reduction gear and is configured to provide electrical power to the propeller shaft or to take mechanical power from the propeller shaft. The electric machine has a rotor driven in rotation about an axis coaxial with a longitudinal axis of the turbomachine and a stator connected to a casing. The input pinion includes an input shaft offset from an axis of the output pinion, and the speed reduction gear has two parallel intermediate transmission lines configured to transmit the torque from the input pinion to the output pinion to drive the rotor in rotation.

11 Claims, 7 Drawing Sheets

(51) Int. Cl.
  *B64D 35/024* (2025.01)
  *F01D 15/10* (2006.01)
  *F16H 1/22* (2006.01)

(52) U.S. Cl.
  CPC ....... *F16H 1/22* (2013.01); *F05D 2260/4031* (2013.01)

(58) Field of Classification Search
  CPC ... F05D 2260/4031; F05D 2260/40311; F05D 2220/324; F05D 2220/36; F05D 2220/76; B64D 35/00–08; F02C 7/36; F02K 5/00; F16H 1/22
  See application file for complete search history.

(56) References Cited

U.S. PATENT DOCUMENTS

| | | | | |
|---|---|---|---|---|
| 10,443,697 | B2* | 10/2019 | Feraud | F16H 1/20 |
| 11,530,033 | B2* | 12/2022 | Preisser | B64C 27/14 |
| 12,065,935 | B2* | 8/2024 | Peltier | F02C 7/32 |
| 2018/0372197 | A1* | 12/2018 | Mathieu | F01D 25/18 |
| 2022/0412436 | A1* | 12/2022 | Zaraphonitis | F16H 1/28 |
| 2023/0133871 | A1* | 5/2023 | Levisse | F02C 7/36 |
| | | | | 415/122.1 |
| 2023/0358177 | A1* | 11/2023 | Desjardins | F16H 57/0423 |
| 2023/0417180 | A1* | 12/2023 | Klonowski | F01D 15/10 |
| 2024/0254924 | A1* | 8/2024 | Fernandez | B64C 11/48 |

\* cited by examiner

FIG. 1

(PRIOR ART)

TURBOMACHINE COMPRISING A SPEED REDUCTION GEAR INTEGRATING AN ELECTRIC MACHINE

CROSS-REFERENCE TO RELATED APPLICATION

This application claims priority to FR 2300889, filed Jan. 31, 2023, the disclosure of which is hereby expressly incorporated by reference herein in its entirety.

TECHNICAL FIELD

The present disclosure relates generally to turbomachines, such as those used for aircraft. In particular, the disclosure is directed to a mechanical speed reduction gear, such as for a turbomachine, in which an electric machine is integrated.

BACKGROUND

The role of a mechanical reduction gear is to modify the speed and torque ratio between the input axle and the output axle of a mechanical system.

The aircrafts equipped with turboprop engines are generally equipped with a mechanical reduction gear (referred by the acronym "PGB" for Propeller Gear Box) which adapts the speed of rotation between the turbine and the propeller while allowing to generate an offset between the axis of rotation of the propeller and the axis of rotation of the turbine. This offset, also referred to as the "Offset", allows to ensure that the air inlet is well integrated vertically under the reduction gear.

There are several possible solutions for improving the performance and efficiency of these turboprop engines during certain phases of flight (take-off, taxiing, etc.). One of these solutions is to hybridize the turboprop engine by adding an electric machine (in motor mode) to the reduction gear so as to provide additional power during the flight phases concerned. It is also possible to use this electric machine (in generator mode) to recover energy or power during certain phases of flight.

There are several reduction gear architectures. In the prior art of the turboprop engines, reduction gears are of the planetary type with offset or epicyclic with offset. There are also architectures referred to as compound architectures.

In a planetary offset reduction gear, the planet carrier is stationary, and the ring gear forms the output shaft of the device, which rotates in the opposite direction to the sun gear.

In an offset epicyclic reduction gear, the ring gear is stationary, and the planet carrier is the output shaft of the device, which rotates in the same direction as the sun gear.

In a compound reduction gear, no element is attached in rotation and the power is divided between two parallel intermediate lines. The output wheel turns in the same direction as the input pinion.

An offset epicyclic reduction gear comprises an input pinion which meshes with a wheel in stage 1, which in turn drives a central pinion referred to as sun gear which meshes with pinions referred to as planet gears, which in turn mesh with a ring gear. The planet gears are maintained by a chassis referred to as planet carrier. The sun gear, the ring gear and the planet carrier are planetaries because their axes of revolution coincide with the longitudinal axis X of the propeller. The planet gears each have a different axis of revolution equally distributed on the same operating diameter around the axis of the planetaries. These axes are parallel to the longitudinal axis X.

A compound reduction gear comprises an input pinion, from which two intermediate pinions (referred to as idlers) take power. The idler pinions then drive the output line by means of a second set of toothings. By adjusting the number of teeth on the various pinions, it is possible to obtain a speed reduction ratio between the input line and the output line.

An example of reduction gear with intermediate lines is described in the document EP-B1-3201492.

The reduction gears can consist of one or more meshing stages. This meshing is ensured in different ways such as by contact, friction or magnetic field.

There are several types of contact meshing such as straight, helical or herringbone toothings.

Figure 1:
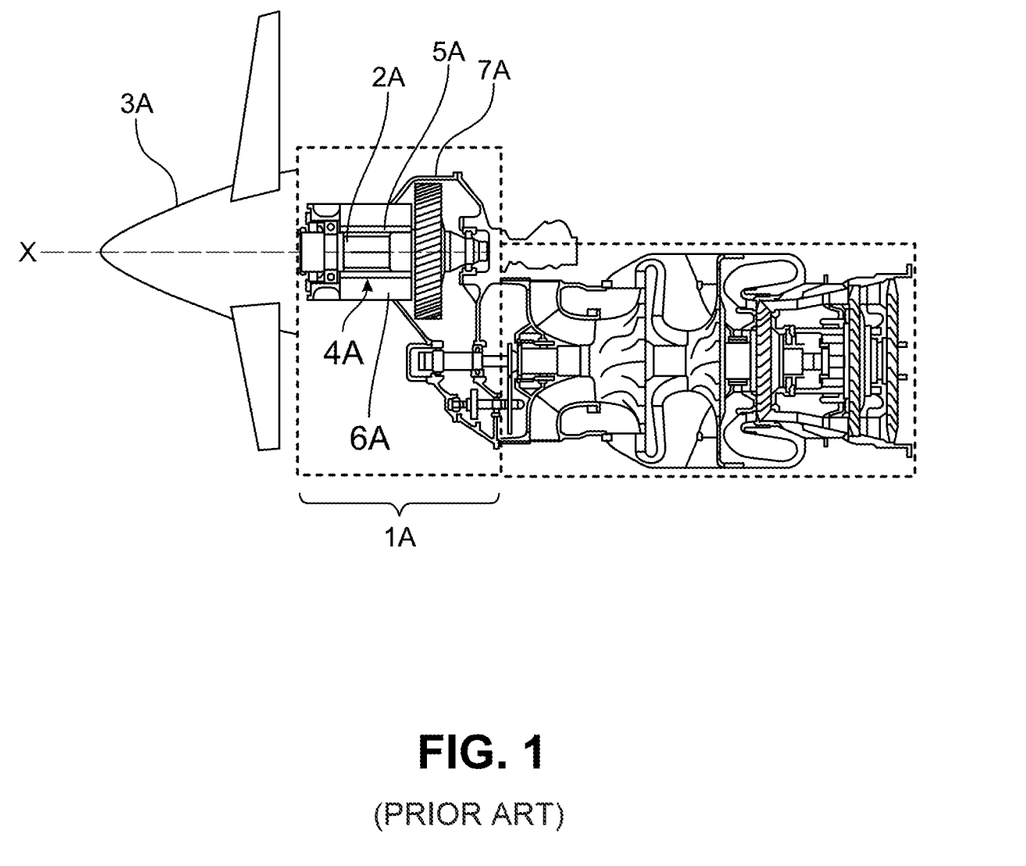
FIG. 1 shows an example of a turboprop engine comprising a reduction mechanism and an electric machine according to the prior art.

The patent document FR-B1-3073569 and the document FR-A1-3116303 each describe a speed reduction gear 1A allowing to drive the shaft 2A of a propeller 3A of a turboprop engine in rotation as shown in FIG. 1. The speed reduction gear 1A is equipped with an electric machine 4A designed to provide electrical power to the aircraft. The electric machine 4A is arranged in the volume dedicated to the speed reduction gear 1A so as not to impact on the overall dimension in this area of the turboprop engine. The electric machine 4A comprises a hollow rotor 5A which is detachably connected to the shaft 2A of the propeller and coaxial with it. In particular, the shaft 2A of the propeller passes through the rotor 5A. The electric machine comprises a stator 6A which is connected to a stator casing 7A of the turboprop engine. The stator casing 7A surrounds the shaft 2A and comprises a bore in which the stator 6A is mounted. The latter extends outside the rotor. The configuration of the electric machine is compact. However, this type of integration is viable as long as the level of electrical power required by the items of equipment of the aircraft remains moderate. The more powerful the electric machine, the greater its volume, which can severely limit its integration within the speed reduction gear. Yet more and more items of equipment is powered by electrical energy to reduce its environmental impact.

There is a need to resolve some or all of the above disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The aim of the present disclosure is to provide a simple and economical solution allowing for integrating an electric machine into a speed reduction gear without impacting the overall dimensions and on the configuration of nearby members.

This is achieved in accordance with the disclosure by means of a turbomachine, in particular for an aircraft, having a longitudinal axis X and comprising:
  a power shaft,
  a propeller shaft centered on the longitudinal axis and designed and configured to drive at least one propeller of the turbomachine,
  at least one speed reduction gear intended and configured to be driven by the power shaft and to drive the propeller shaft in rotation at a speed different from that of the drive shaft, the speed reduction gear comprising an input pinion connected to the power shaft and an output pinion connected to the propeller shaft, and at least one electric machine which is integrated into the speed reduction gear, and which is configured so as to provide electrical power to the propeller shaft or to take mechanical power from the propeller shaft, the electric machine comprising a rotor which is configured so as to be driven in rotation about an axis coaxial with the longitudinal axis X and a stator connected to a casing of the turbomachine, the input pinion comprising an input axis offset with respect to an axis of the output pinion and in that the speed reduction gear comprises at least two intermediate transmission lines which are substantially parallel, and which are configured to transmit the torque from the input pinion to the output pinion, which is intended and configured to drive the rotor in rotation.

Thus, this solution achieves the above-mentioned objective. In particular, offsetting the axle of the input pinion from the axle of the output pinion and providing torque transmission means between the input and output pinions allows the speed reduction gear to be arranged in the axle of the propeller. The latter can therefore have different types of power without impacting on the overall dimension in the volume where the speed reduction gear is located and also the overall dimension within the speed reduction gear. More specifically, the radial overall dimension is reduced, and the axial overall dimension is small. This arrangement also allows to retain the layout of any pitch change system for variable pitch propellers. Driving the rotor by the output pinion and vice versa makes it easier to integrate the rotor into the speed reduction gear and improves the performance of the electric machine.

The turbomachine also comprises one or more of the following characteristics, taken alone or in combination:

each intermediate transmission line comprises a first intermediate pinion mounted so as to rotate about an axis of rotation and comprising a first toothing intended and configured so as to mesh with an external toothing of the input pinion.

each intermediate transmission line comprises a second intermediate pinion mounted so as to rotate about an axis of rotation and comprising a second toothing intended and configured so as to mesh with an external toothing of the output pinion.

the speed reduction gear comprises a drive wheel driven, on the one hand, by the output pinion and driving, on the other hand, a complementary pinion mounted on the rotor, the complementary pinion of the rotor comprising an axis parallel to the axis of the propeller shaft.

the drive wheel comprises a first external toothing meshing with an internal toothing of the output pinion and a second external toothing meshing with an external toothing of the complementary pinion.

the rotor is hollow and the propeller shaft passes through at least part of it.

the stator extends radially outside from the rotor.

the turbomachine comprises a pitch change system arranged coaxially with the axis of the propeller shaft.

the pitch change system is arranged at least partly inside the rotor.

the turbomachine comprises an air inlet arranged below the speed reduction gear in a vertical direction perpendicular to the longitudinal axis.

the electric machine is annular.

the electric machine has a generally cylindrical shape.

the axis of rotation of the first intermediate pinion is colinear with the longitudinal axis.

the axis of rotation of the second intermediate pinion is colinear with the longitudinal axis.

the pitch change system comprises a shaft or a member which is attached to the second end of the propeller shaft.

the speed reduction gear comprises a single electric machine.

the speed reduction gear comprises electric machines connected in series along the longitudinal axis X.

a portion of the cylindrical body of the rotor extends radially above the first intermediate pinions of the intermediate transmission lines.

The disclosure also concerns an aircraft equipped with such a turbomachine.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

FIG. 1 shows an axial cross-section of a turbomachine equipped with a reduction mechanism, as described above.

Figure 2:
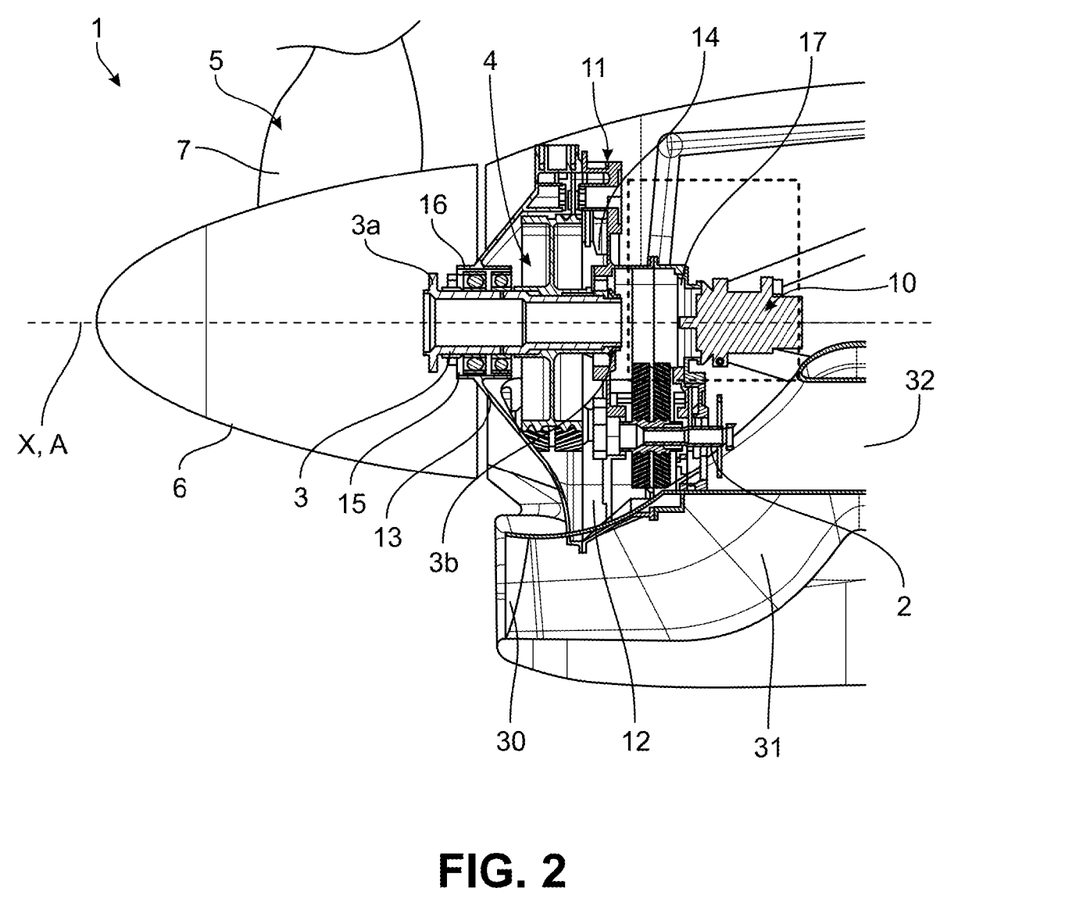
FIG. 2 illustrates an example of the arrangement of a reduction mechanism in a turbomachine according to the disclosure.

FIG. 2 shows a turbomachine 1 with a longitudinal axis X. The turbomachine 1 shown is a turboprop engine equipped with a single unducted propeller intended to be mounted on an aircraft. The turboprop engine may comprise a doublet of counter-rotating, unducted propellers. These turboprop engines are referred to as "open rotor." Of course, the turbomachine can be a single flow or double flow turbojet engine.

The turbomachine comprises a power shaft 2, a propeller shaft 3 and a reduction mechanism. Advantageously, the reduction mechanism is a speed reduction gear 4 which is intended and configured to be driven by the power shaft 2 and to rotate the propeller shaft 3 at a different speed from that of the power shaft.

Advantageously, the speed of the power shaft 2 is higher than that of the propeller shaft 3. For example, the speed of the power shaft 2 is around 25,000 rpm, while the speed of the propeller shaft 3 is around 2,000 rpm. This ensures an optimum drive of the propeller shaft 3 and an efficient propulsion of the aircraft.

The propeller shaft 3 has an axis of rotation A which is centered on the longitudinal axis X. Advantageously, the propeller shaft 3 extends between a first end 3a and a second end 3b.

Advantageously, the turbomachine comprises an unducted propeller 5 which is connected to the propeller shaft 3. The propeller shaft 3 is intended and configured so as to drive the propeller 5 in rotation in order to propel the aircraft. The propeller 5 comprises a cylindrical casing 6 which is attached to the first end 3a of the propeller shaft 3.

Each propeller 5 comprises blades 7 which are arranged regularly around the longitudinal axis X. The blades 7 comprise roots, each of which is housed in a housing provided in an annulus (not shown) and extends from this annulus. The annulus is centered on the longitudinal axis and is secured in rotation to the cylindrical casing 6.

A pitch change system 10 is provided to change the pitch or the orientation of the blades 7 of each propeller 5 about a radial pitch axis. This allows the blades to be oriented in a desired angular position depending on the operating conditions of the turbomachine and the different phases of flight. In the present example, the pitch change system 10 is arranged along the longitudinal axis of the turbomachine and more precisely still along the axis of the propeller shaft 3.

As can be seen in FIG. 2, the speed reduction gear 4 is positioned in the upstream part of the turbomachine. The pitch change system 10 is advantageously located downstream of the speed reduction gear 4.

In the present disclosure, the terms "upstream" and "downstream" are defined in relation to the circulation of the gases in the turbomachine and here along the longitudinal axis X and in FIG. 2 from left to right.

The speed reduction gear 4 and the pitch change system 10 are arranged in an internal volume of the turbomachine. Advantageously, but in a non-limiting manner, the speed reduction gear 4 is arranged in the internal volume of the nacelle where there is little space available.

In particular, the turbomachine 1 schematically comprises a stator casing 11. The stator casing 11 is arranged to form an enclosure 12 surrounding the speed reduction gear 4. Advantageously, the stator casing 11 is independent of the casings of the turbomachine, such as the inlet casing of the turbomachine 1. The casing 11 is secured to the nacelle of the turbomachine. A lubricant mist prevails in the enclosure 12. The propeller shaft 3 passes at least partly through the enclosure 12 along the longitudinal axis X.

Advantageously, but in a non-limiting manner, the casing 11 comprises an upstream part 13 and a downstream part 14. The upstream part 13 and the downstream part 14 are separated from each other here. The upstream part 13 of the casing 11 comprises a first opening 15 through which the propeller shaft 3 can pass. The first opening 15 is delimited by a cylindrical wall 16 centered on the longitudinal axis X. The downstream part 14 comprises a second opening 17 allowing at least part of the pitch change system 10 to pass through. The second opening 17 is delimited by a cylindrical skirt 18 (better visible in FIG. 3) which is centered on the longitudinal axis X.

The upstream part 13 and the downstream part 14 are attached to each other, for example using a radial flange and a bolted connection. The downstream part 14 can be made in a single piece or in two portions 14a, 14b as shown in FIGS. 2 and 3.

Figure 3:
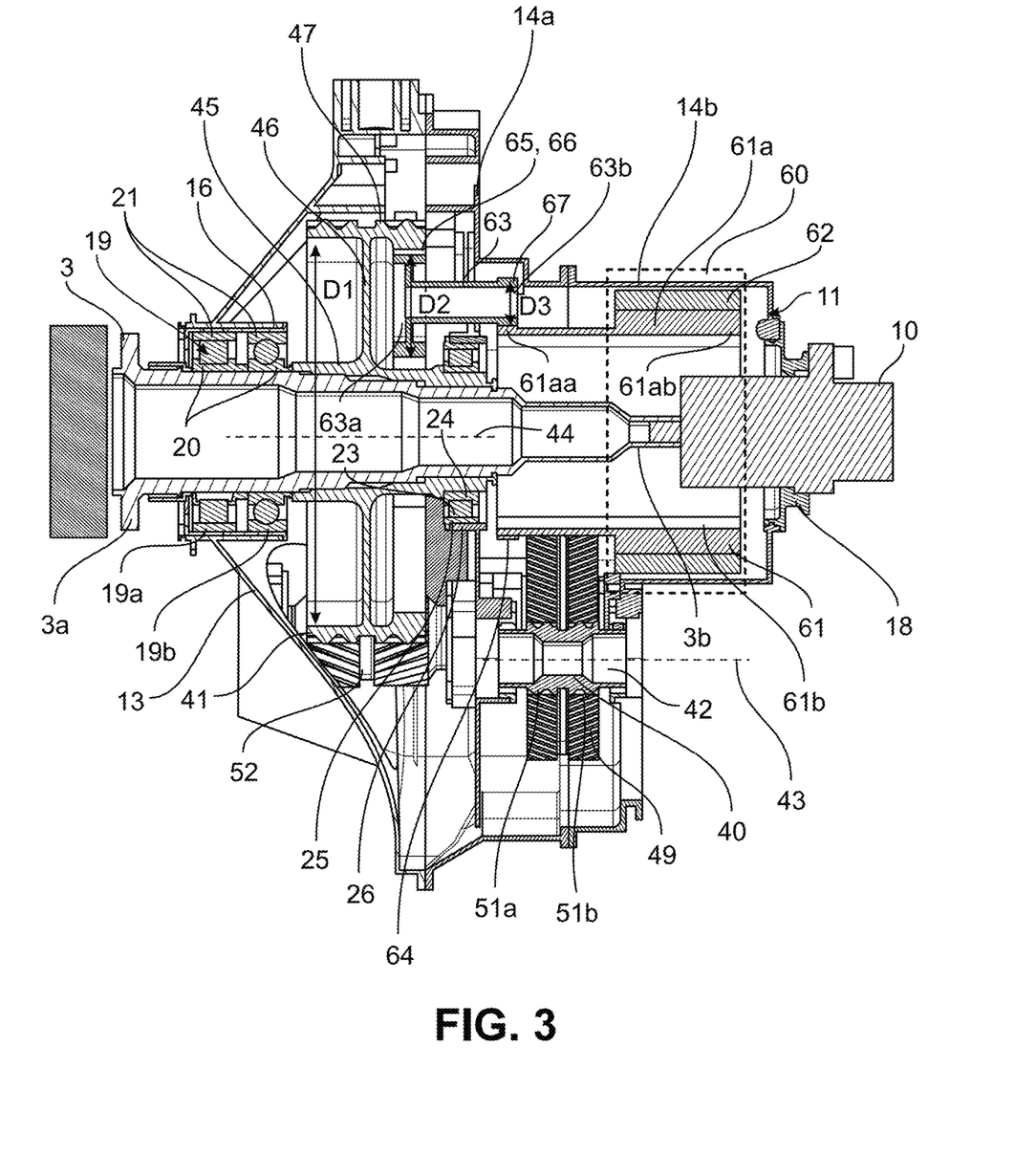
FIG. 3 is an axial sectional view of an example of a reduction mechanism in which an electric machine according to the disclosure is integrated.

With reference to FIG. 3, the propeller shaft 3 is driven in rotation relative to the casing 11 by means of bearings. In this example, two upstream bearings 19 are mounted upstream of the enclosure 12. Advantageously, the two upstream bearings 19 are mounted upstream of the speed reduction gear 4. Each upstream bearing 19 comprises an internal ring 20 secured to the propeller shaft 3 and an external ring 21 secured to the cylindrical wall 16 of the casing. In the example shown, the first upstream bearing 19a comprises roller bearings and the second upstream bearing 19b comprises ball bearings.

Advantageously, the propeller shaft 3 is also driven downstream by a downstream bearing 23. The downstream bearing 23 is mounted downstream of the enclosure 12. More specifically, the downstream bearing 23 is mounted downstream of an output pinion 41, which will be described in more detail later. The downstream bearing 23 comprises an internal ring 24 which is secured to a cylindrical shaft 45 of the output pinion 41. The downstream bearing 23 comprises an external ring 25 which is secured to an annular wall 26 of the stator casing 11.

Advantageously, but without limitation, the enclosure 12 is closed upstream by seals at the level of the upstream bearings 19 allowing the propeller shaft 3 to pass through, and downstream by seals at the level of the cylindrical skirt 18.

In the present embodiment, the pitch change system 10 is arranged at least partly in the enclosure 12 and extends along the longitudinal axis. Advantageously, the pitch change system 10 comprises a shaft or a member which is attached to the second end 3b of the propeller shaft 3.

With reference to FIG. 2, the turbomachine 1 also comprises an air inlet 30 which is arranged below the speed reduction gear 4 in a vertical direction perpendicular to the longitudinal axis (and in the plane of FIG. 2). In other words, the air inlet is directly in line with the longitudinal axis. Advantageously, the air inlet 30 is extended downstream by an air sleeve 31 which extends below the speed reduction gear 4 and the pitch change system 10. Here, the air inlet 30 is defined in a radial plane which is arranged upstream of the output pinion 41. However, the air inlet could be positioned downstream of the output pinion 41.

Advantageously, the air sleeve 31 is S-shaped. The air sleeve 31 has an air outlet 32 which is defined in a radial plane located downstream of the pitch change system. The speed reduction gear 4 and the pitch change system 10 are located in particular in a hollow area of the air sleeve 31 and delimit the available volume.

In FIG. 3, the speed reduction gear 4 comprises a gear train with intermediate transmission lines, also referred to as a compound reduction gear. The speed reduction gear 4 is referred to by the acronym PGB for "Propeller Gear Box" or RGB for "Reduction Gear Box." The compound speed reduction gear require a load balancing system so as to equalize the loads between intermediate lines.

The speed reduction gear 4 comprises an input pinion 40 and an output pinion 41 which are rotatable. The input pinion 40 is connected to the power shaft. Advantageously, the input pinion 40 is carried by a shaft 42 and are coaxial. In the present embodiment, the input pinion 40 has an input axis 43 which is parallel to the longitudinal axis X of the turbomachine. The power shaft 2 is coupled to the shaft 42 of the input pinion 40, for example by means of splines, so that the power shaft 2 is secured to the input pinion 40. The power shaft thus drives the input pinion 40 in rotation.

Advantageously, the power shaft is a turbine shaft typically found in a turbomachine.

The output pinion 41 is connected to the propeller shaft 3. The connection is made using splines, for example, so that the propeller shaft 3 is secured to the output pinion 41. The output pinion 41 has an output axis 44 which coincides with that of the propeller shaft (and with the longitudinal axis). In other words, the output pinion is rotatable about the output axis 44, which is colinear with the longitudinal axis X. In other words, the axis of the input pinion 40 is offset, in this case radially, from the output axis 44 of the output pinion 41.

In this example of embodiment, the output pinion 41 comprises a cylindrical shaft 45 extending along the output axis 44. The output pinion 41 comprises a rim 46 which extends radially around the cylindrical shaft 45 and carries at least one external toothing 47.

Figure 4:
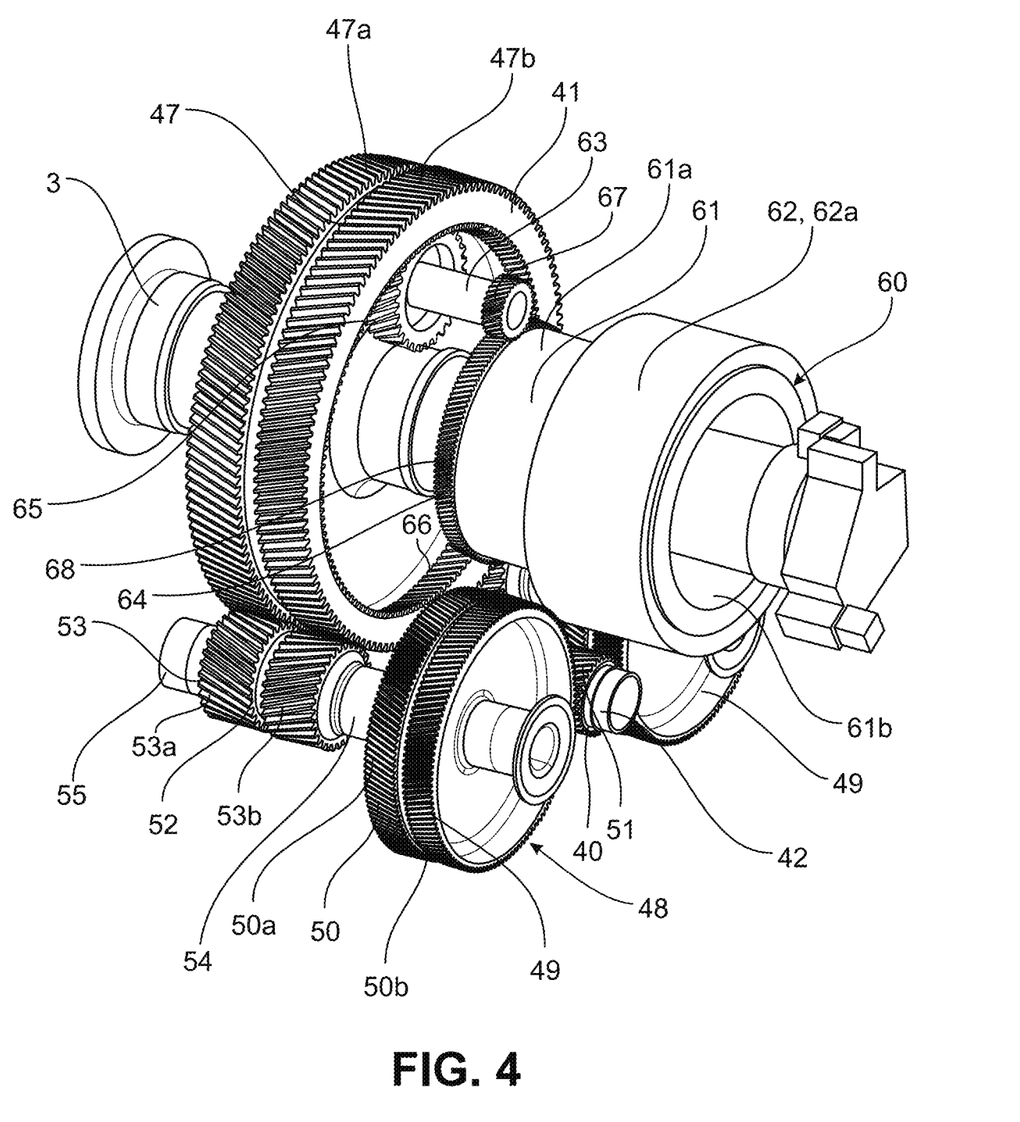
FIG. 4 is a perspective view of an example of a reduction mechanism according to the disclosure.

In FIG. 4, the speed reduction gear 4 comprises torque transmission means 48 which are configured to transmit the torque from the input pinion 40 to the output pinion 41. In particular, the power transmitted by the input pinion 40 is distributed by the torque transmission means 48 before being transferred to the output pinion 41.

Advantageously, the torque transmission means 48 comprise two first intermediate pinions 49 mounted so as to rotate about axes which are parallel to each other. The axes of the first intermediate pinions 49 are also parallel to the longitudinal axis. The first two intermediate pinions 49 comprise toothings 50 which mesh with a toothing 51 on the input pinion 40.

In this example, the transmission means 48 comprise two intermediate transmission lines 55. The two intermediate lines 55 are substantially parallel (more or less inclined by 5°) and are substantially identical. In another configuration example, the intermediate lines 55 can be inclined at an angle greater than 5°.

Figure 5:
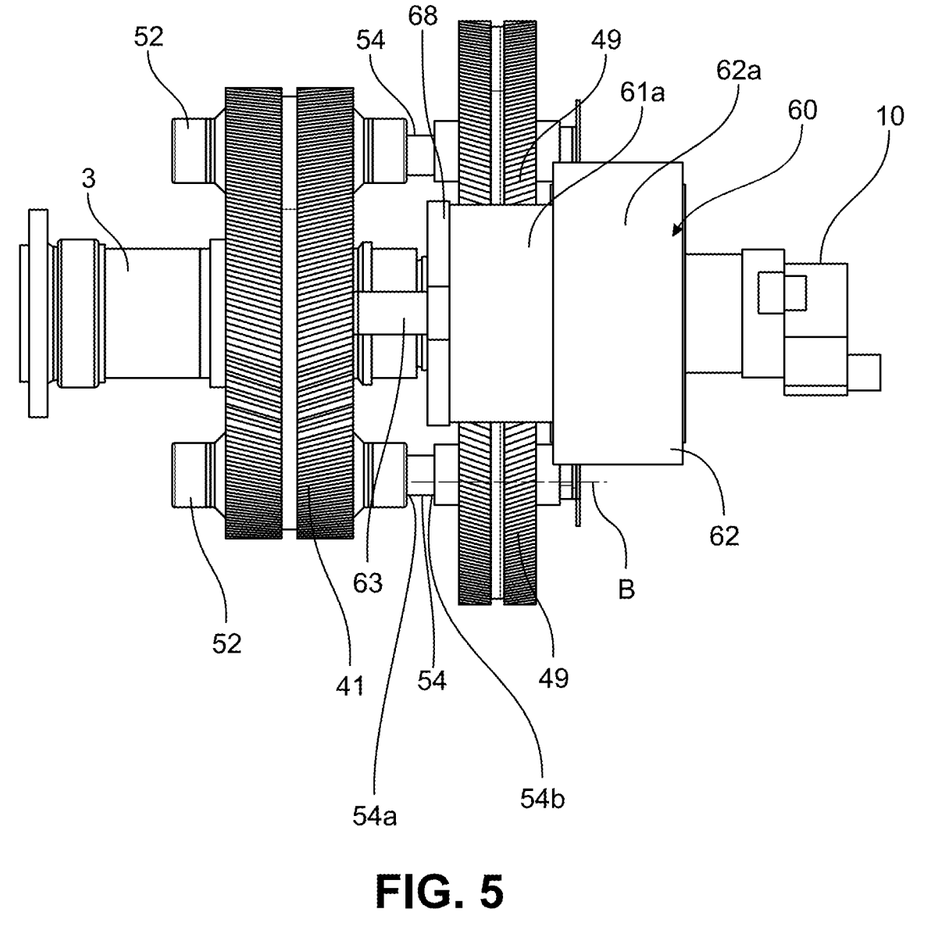
FIG. 5 is a top view of the reduction mechanism shown in FIG. 4.

With reference to FIGS. 4 and 5, each intermediate transmission line 55 advantageously comprises a second intermediate pinion 52 mounted so as to rotate about an axis of rotation. The latter is coaxial with a corresponding intermediate line 55. The axes of the second intermediate pinions 52 are also parallel to the longitudinal axis. The second intermediate pinions 52 each comprise an external toothing 53 which mesh with the external toothing 47 of the output pinion.

Advantageously, the first intermediate pinion 49 and the second intermediate pinions 52 are secured in rotation. In particular, the first pinions 49 and second pinions 52 of each intermediate line 55 are carried by a shaft 54. This shaft can be flexible and used for the balancing of the loads thanks to its flexibility. The shaft 54 can also be used to measure torque.

Advantageously, but without limitation, the shaft 54 extends between a first end 54a and a second end 54b. Each first intermediate pinion 49 is arranged at the first end of the shaft 54 and each second intermediate pinion 52 is arranged at the second end of the shaft 54.

Advantageously, the second intermediate pinions 52 are arranged upstream of the first intermediate pinions 49.

The toothing 51, 47 of the input and output pinions can be straight (parallel to the longitudinal axis), helical or herringbone. Similarly, the toothing of the input and output pinions can be split into several propellers for reasons of operation, assembly, manufacture, inspection, repair or replacement.

With reference to FIGS. 4 and 5, and optionally, at least one of the input pinions, output pinions, first intermediate pinions and second intermediate pinions is split into two half-portions:

a first portion consisting of a rim which carries the first propeller of the toothing. This first propeller meshes with that of another pinion of the speed reduction gear;

a second portion consisting of a rim which carries the second propeller of the toothing. This second propeller meshes with that of another pinion.

In the present example of embodiment, the input pinion 40 comprises two half-portions carrying a first propeller 51a and a second propeller 51b respectively. The first propeller 51a meshes with a first propeller 50a of each of the first intermediate pinions 49 and the second propeller 51b meshes with a second propeller 50b of each of the first intermediate pinions 49. The output pinion 41 comprises two half-portions carrying a first propeller 47a and a second propeller 47b respectively. The first propeller 47a meshes with a first propeller 53a of each of the second pinions 52 and the second propeller 47b meshes with a second propeller 53b of each of the second intermediate pinions 52.

Advantageously, the direction of the first propeller is different from that of the second propeller. The directions are opposite.

Of course, each of the pinions can be formed from a single piece.

As illustrated in FIGS. 2 to 6, the speed reduction gear 4 also comprises at least one electric machine 60. More specifically, the latter is integrated into the speed reduction gear 4. This configuration allows to limit the overall dimension in the turbomachine. The speed reduction gear 4 comprises space that was not previously used. The electric machine 60 is configured to provide electrical power to the propeller shaft and to the aircraft (generator mode). Advantageously, the electric machine can also take mechanical power from the propeller shaft (motor mode). To this end, the aircraft comprises an electrical circuit (not shown) which is connected, on the one hand, to the electric machine 60 and, on the other hand, to various items of equipment on the aircraft.

In this example of embodiment, the speed reduction gear comprises a single electric machine.

The turbomachine 1 could comprise two electric machines. In this case, the two electric machines would be connected in series, more precisely one after the other along the longitudinal axis X. Similarly, a single power electronics unit would be used for both electric machines.

The electric machine comprises a rotor 61 and a stator 62. The rotor 61 is configured to be driven in rotation about an axis coaxial with the axis of the propeller shaft and the stator 62 is connected to the stator casing 11 of the turbomachine. An advantageous characteristic is that the output pinion 41 of the speed reduction gear 4 is designed and configured to drive in rotation the rotor 61 of the electric machine 60.

Advantageously, the rotor 61 is hollow. This is arranged so that the propeller shaft 3 passes through it at least in part.

Even more specifically, and as illustrated in FIG. 3, the rotor 61 has a cylindrical body 61a with a straight circular cross-section. The body 61a extends between a first end 61aa and a second end 61ab (along the longitudinal axis). The rotor 61 comprises an internal bore 61b, the axis of which is coaxial with the axis of the propeller shaft 3. This configuration further reduces the overall dimension in and around the speed reduction gear.

As can be seen in FIGS. 3 to 5, a portion of the cylindrical body 61a extends radially above the first intermediate pinions 49, which allows the axial overall dimension to be further controlled. Advantageously, but without limitation, the first end 61aa of the cylindrical body is located upstream of the first intermediate pinions 49.

Advantageously, the pitch change system 10 is arranged at least partly inside the rotor 61. As can be seen in FIG. 3, the interface between the propeller shaft 3 and the pitch change system 10 is located inside the rotor 61.

With reference to FIGS. 3 to 6, the speed reduction gear 4 comprises a drive wheel 63 driven, on the one hand, by the output pinion 41 and driving, on the other hand, a complementary pinion 64 mounted on the rotor 61. The complementary pinion 64 comprises an axis parallel to the axis of the propeller shaft 3. This configuration allows the rotor of the electric machine to be driven by the speed reduction gear without affecting the overall dimensions.

Advantageously, but without limitation, the complementary pinion 64 is formed in a single piece with the rotor 61. In this case, the complementary pinion 64 is mounted radially outside the body of the rotor 61. Alternatively, the complementary pinion 64 is fitted to the body of the rotor 61. Advantageously, the complementary pinion 64 is arranged at the first end 61*aa* of the rotor.

The drive wheel 63 is mounted radially inside the output pinion 41. To this end, the drive wheel 63 comprises a first external toothing 65 meshing with an internal toothing 66 of the output pinion 41. Advantageously, but without limitation, the external diameter D2 of the first external toothing 65 is smaller than the internal diameter D1 of the output pinion 41. The arrangement of the drive wheel 63 inside the output pinion 41 allows to reduce the radial overall dimension and move closer to the axis of the propeller shaft coaxial with the rotor of the electric machine.

Advantageously, the drive wheel 63 comprises a second external toothing 67 meshing with an external toothing 68 of the complementary pinion 64. According to this embodiment, the external diameter D3 of the second external toothing 67 is smaller than the diameter D2 of the first external toothing 65.

As shown in FIGS. 3 and 4, the drive wheel 63 extends between a first end 63*a* and a second end 63*b*. The first external toothing 65 is advantageously arranged at the level of the first end 63*a* and the second external toothing 67 is advantageously arranged at the level of the second end 63*b*.

Advantageously, the drive wheel 63 remains in the same plane XY. In general, the pinions do not move along the longitudinal axis.

The stator 62 of the electric machine 60 extends radially outside the rotor 61. Advantageously, the stator 62 comprises a cylindrical body 62*a* coaxial with the axis of the rotor 61. In this example, the stator 62 is attached to the casing 11. The stator 62 is hollow and houses the rotor which extends inside it. In particular, the cylindrical body 62*a* also comprises an internal bore.

Of course, the stator 62 and the rotor 61 can have different shapes as long as they are complementary and can be easily integrated into the available space of the speed reduction gear.

The electric machine 60 can operate in either motor mode or generator mode.

Figure 6:
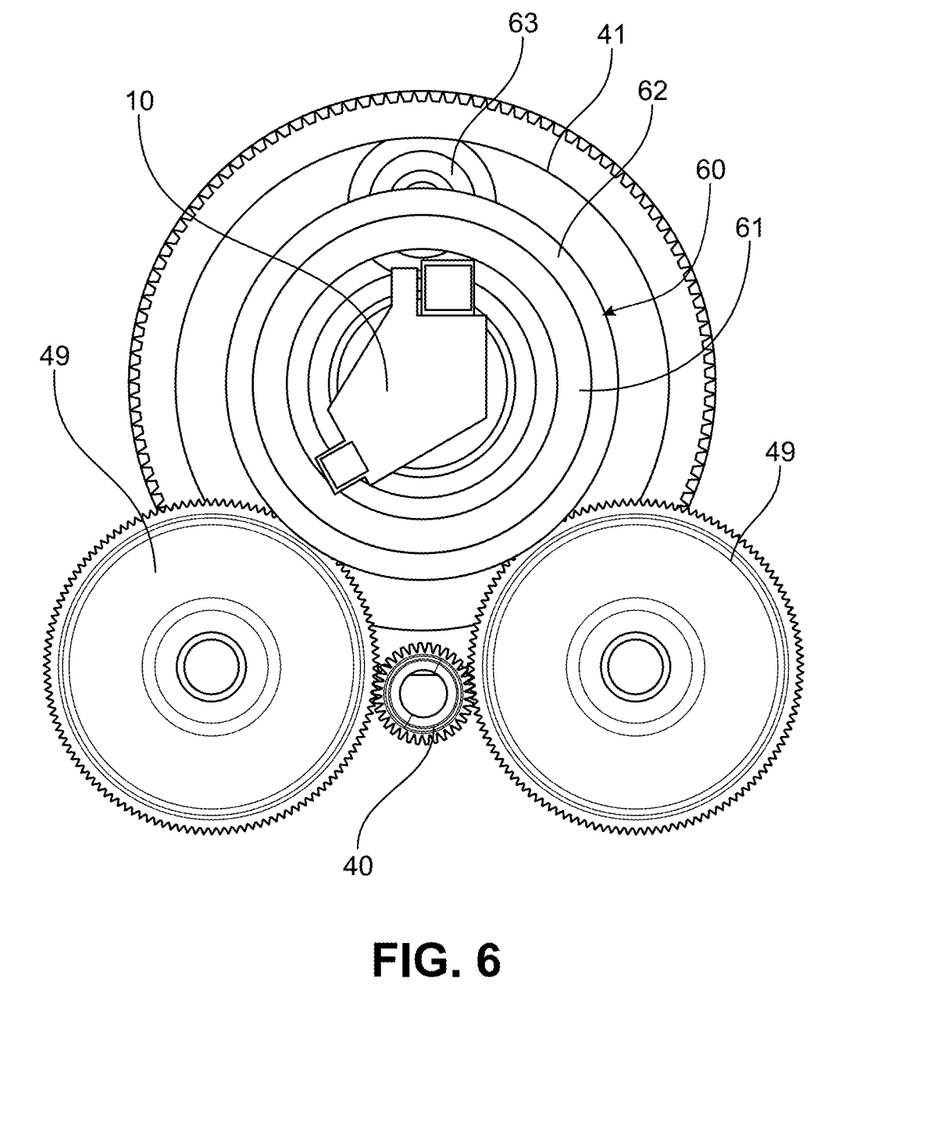
FIG. 6 is a rear view of the reduction mechanism shown in FIG. 4.
Figure 7:
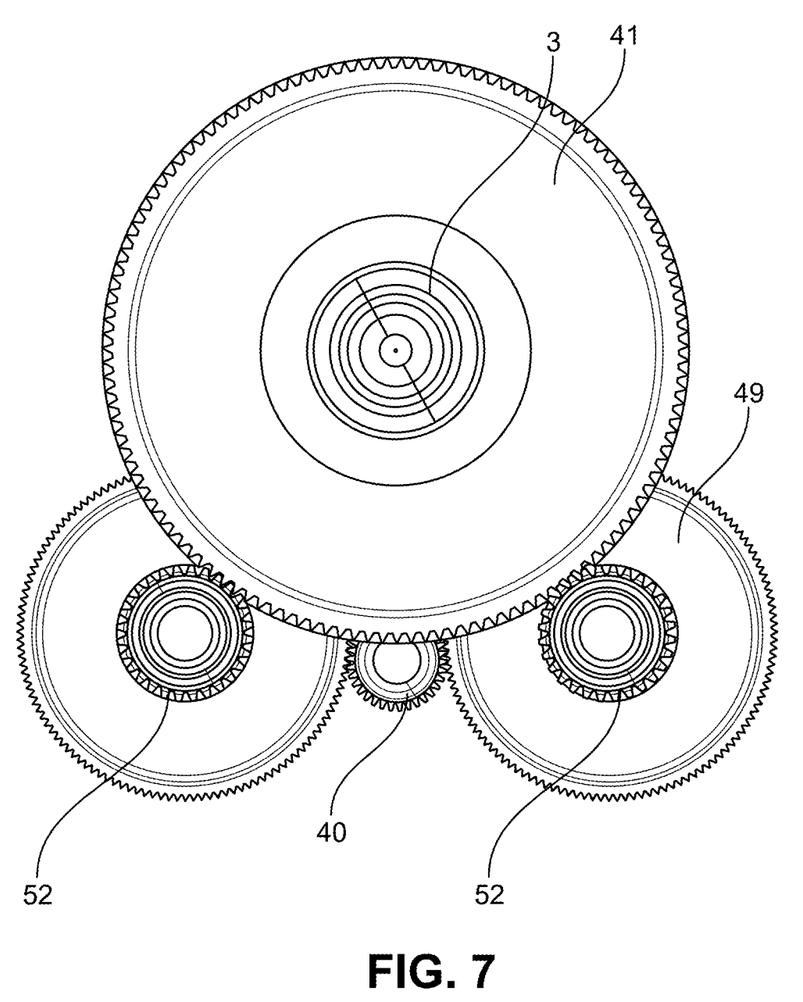
FIG. 7 is a front view of the reduction mechanism shown in FIG. 4.

If the electric machine is operating in generator mode (the propeller shaft or the turbomachine 1 is sending power to the electric machine), the input pinion 40 meshes with the first intermediate pinions 49 as shown in FIG. 6. The rotation of the first intermediate pinions 49 causes the rotation of the second intermediate pinions 52. The latter mesh with the output pinion 41, the internal toothing 66 of which mesh with the first external toothing 65 of the drive wheel 63, as can be seen in FIG. 6 and FIG. 7. The rotation of the output pinion 41 drives the rotation of the drive wheel 63. This drives in rotation the complementary pinion 64 mounted on the rotor 61 via the external toothings.

If the electric machine 60 is operating in motor mode (the electric machine sends power towards the propeller shaft), the complementary pinion 64 of the rotor is driven in rotation and drives the drive wheel 63 via the second external toothing 67. The first external toothing 65 of the drive wheel 63 (which also carries the first toothing) drives the output pinion 41. The latter drives the intermediate lines 55 and then the input pinion 40.

The embodiments of the disclosure in which an exclusive property or privilege is claimed are defined as follows:

1. A turbomachine having a longitudinal axis and comprising:
    a power shaft,
    a propeller shaft centered on the longitudinal axis,
    at least one speed reduction gear, the at least one speed reduction gear comprising an input pinion connected to the power shaft and an output pinion connected to the propeller shaft, and
    at least one electric machine which is integrated into the speed reduction gear and which is configured to provide electrical power to the propeller shaft or to take mechanical power from the propeller shaft, the at least one electric machine comprising a rotor configured to be driven in rotation about an axis coaxial with the longitudinal axis and a stator connected to a casing of the turbomachine,
    wherein the input pinion comprises an input axis offset relative to an axis of the output pinion, which is coaxial with the longitudinal axis, and the speed reduction gear comprises at least two intermediate transmission lines that are parallel and are configured to transmit the torque from the input pinion to the output pinion, which is configured to drive the rotor in rotation,
    wherein the speed reduction gear comprises a drive wheel which comprises a first external toothing meshing with an internal toothing of the output pinion and a second external toothing meshing with an external toothing of a complementary pinion.

2. The turbomachine according to claim 1, wherein each intermediate transmission line comprises a first intermediate pinion mounted to rotate about an axis of rotation and comprising a first toothing configured to mesh with an external toothing of the input pinion.

3. The turbomachine according to claim 1, wherein each intermediate transmission line comprises a second intermediate pinion mounted to rotate about an axis of rotation and comprising a second toothing configured to mesh with an external toothing of the output pinion.

4. The turbomachine according to claim 1, wherein the rotor is hollow and is passed through at least in part by the propeller shaft.

5. The turbomachine according to claim 1, wherein the stator extends radially outside the rotor.

6. The turbomachine according to claim 1, wherein an air inlet is arranged below the speed reduction gear in a vertical direction perpendicular to the longitudinal axis.

7. A turbomachine having a longitudinal axis and comprising:
    a power shaft,
    a propeller shaft centered on the longitudinal axis,
    at least one speed reduction gear, the at least one speed reduction gear comprising an input pinion connected to the power shaft and an output pinion connected to the propeller shaft, and at least one electric machine which is integrated into the speed reduction gear and which is configured to provide electrical power to the propeller shaft or to take mechanical power from the propeller shaft, the at least one electric machine comprising a rotor configured to be driven in rotation about an axis coaxial with the longitudinal axis and a stator connected to a casing of the turbomachine, wherein the input pinion comprises an input axis offset relative to an axis of the output pinion, which is coaxial with the longitudinal axis, and the speed reduction gear comprises at least two intermediate transmission lines that are parallel and are configured to transmit the torque from the input pinion to the output pinion, which is configured to drive the rotor in rotation, wherein the speed reduction gear comprises a drive wheel driven, on the one hand, by the output pinion and driving, on the other hand, by a complementary pinion mounted on the rotor, the complementary pinion of the rotor comprising an axis parallel to the axis of the propeller shaft, wherein the drive wheel comprising first teeth meshing with second teeth of the output pinion, wherein the rotor has a cylindrical body and the complementary pinion extending radially outside the cylindrical body of the rotor.

8. The turbomachine according to claim 7, wherein the drive wheel comprises a first external toothing meshing with an internal toothing of the output pinion and a second external toothing meshing with an external toothing of the complementary pinion.

9. The turbomachine according to claim 7, wherein the drive wheel has an upstream end engaging the output pinion and a downstream end engaging the complementary pinion, the complementary pinion being mounted to an upstream end of the rotor.

10. A turbomachine having a longitudinal axis and comprising:

a power shaft, a propeller shaft centered on the longitudinal axis, at least one speed reduction gear, the at least one speed reduction gear comprising an input pinion connected to the power shaft and an output pinion connected to the propeller shaft, at least one electric machine which is integrated into the speed reduction gear and which is configured to provide electrical power to the propeller shaft or to take mechanical power from the propeller shaft, the at least one electric machine comprising a rotor configured to be driven in rotation about an axis coaxial with the longitudinal axis and a stator connected to a casing of the turbomachine, and a pitch change system having a shaft coupled to an end of the propeller shaft, the shaft of the pitch change system being arranged coaxially with the axis of the propeller shaft, wherein the input pinion comprises an input axis offset relative to an axis of the output pinion, which is coaxial with the longitudinal axis, and the speed reduction gear comprises at least two intermediate transmission lines that are parallel and are configured to transmit the torque from the input pinion to the output pinion, which is configured to drive the rotor in rotation.

11. The turbomachine according to claim 10, wherein the pitch change system is arranged at least partly inside the rotor.

* * * * *